(No Model.)

W. H. PREDMORE.
CALF WEANER.

No. 404,931. Patented June 11, 1889.

WITNESSES:
Jos. A. Ryan
Geo. C. Bollinger

INVENTOR
William H. Predmore
BY
Patrick O'Farrell,
ATTORNEY

UNITED STATES PATENT OFFICE.

WILLIAM H. PREDMORE, OF WALWORTH, NEBRASKA.

CALF-WEANER.

SPECIFICATION forming part of Letters Patent No. 404,931, dated June 11, 1889.

Application filed July 23, 1888. Renewed May 9, 1889. Serial No. 310,196. (No model.)

*To all whom it may concern:*

Be it known that I, WILLIAM H. PREDMORE, a citizen of the United States of America, residing at Walworth, in the county of Custer and State of Nebraska, have invented certain new and useful Improvements in Calf-Weaners, of which the following is a specification, reference being had therein to the accompanying drawings.

This invention pertains to certain new and useful improvements in calf-weaners; and it comprises the detail construction, combination, and arrangement of parts, substantially as hereinafter fully set forth, and particularly pointed out in the claims.

Figure 1:
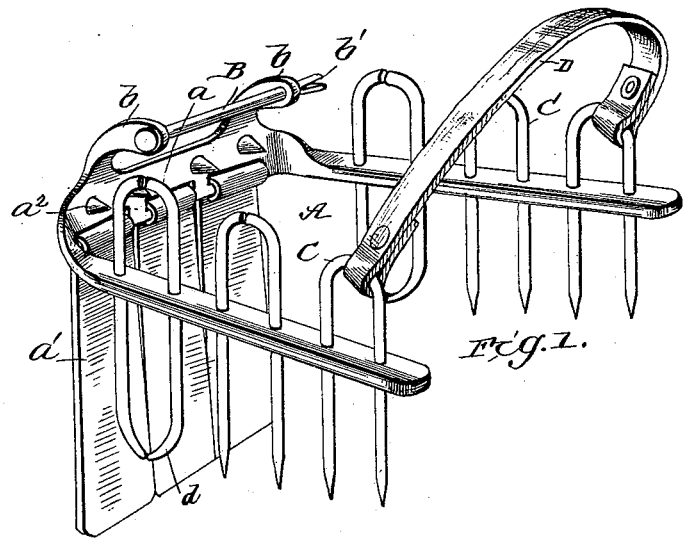
Figure 2:
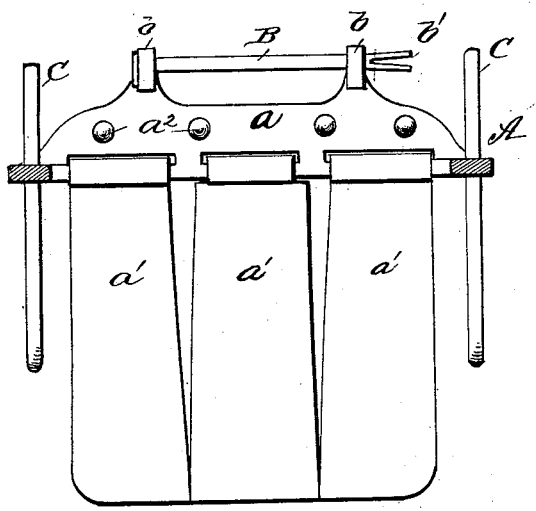
Figure 3:
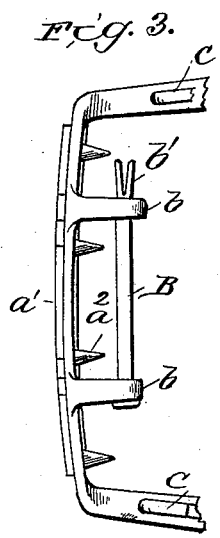
Figure 4:
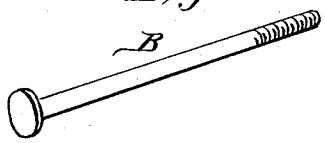

In the accompanying drawings, Figure 1 is a view in perspective of my improved calf-weaner. Fig. 2 is a transverse sectional view thereof. Fig. 3 is a detail, and Fig. 4 is a view of a modification of the retaining-pin.

Referring to the drawings, A designates an approximately U-shaped frame, through slots in the front cross bar or plate $a$ of which are secured the looped ends of depending plates $a'$, and from the inner side of this cross bar or plate project short pointed barbs or teeth $a^2$, which are designed to normally rest near or adjacent to the animal's nose or lip. These plates $a'$ are designed to hang over the animal's mouth and to prevent it from securing a teat in the front of its mouth. Through apertures of two rearwardly-projecting curved arms $b\ b$ of bar or plate $a$ is passed a retaining-pin B, which is inserted through the nose of the animal, for securing the front of the weaner in position. The end of this pin is split, as shown at $b'$, so as to retain the same in position; or the end of said pin can be threaded, as shown in Fig. 4, so as to engage a corresponding thread in one of the arms $b$.

C C are a series of pointed bars passed vertically through the side bars of the U-shaped frame A. The upper ends of these bars are bent or curved toward each other, as shown, so as to prevent the same from catching on anything, and the lower ends of the two front bars of each series are likewise bent, as at $d$, to prevent catching on grass or other objects.

D is a strap having looped ends passed around the upper curved ends of the two rearmost bars of each series of bars C, and this strap is designed to rest upon the animal's head and support the rear portion of the weaner, so as to remove as much weight as possible from the front thereof, and consequently releasing the strain on the nose.

The object of the series of vertical side bars is to prevent the calf from securing a teat in the side of its mouth, as often occurs, and when the calf endeavors to suck, the barbs or teeth $a^2$ will come in contact with its lips or nose and, inflicting slight punishment, will cause the calf to desist in its purpose.

I claim as my invention—

1. As an improvement in calf-weaners, the horizontally-disposed U-shaped frame having a series of vertical side bars projecting above and below the side arms thereof, substantially as described.

2. As an improvement in calf-weaners, the horizontally-disposed U-shaped frame and the series of vertical bars secured to and projecting above and below the side arms thereof, and having their upper ends bent or curved, as set forth.

3. As an improvement in calf-weaners, the U-shaped frame having the curved apertured arms, the cross-pin, the series of vertical side bars, and the strap, substantially as shown and described.

4. As an improvement in calf-weaners, the U-shaped frame having the vertical side bars, and the series of front barbs or teeth, substantially as shown and described.

5. The herein-described improved calf-weaner, comprising] the U-shaped frame, the front cross bar or plate having a series of barbs or teeth, the hanger-plate secured to said bar or plate, the series of vertical side bars, the cross-pin, and the strap, substantially as shown and described.

In testimony whereof I affix my signature in presence of two witnesses.

WILLIAM H. PREDMORE.

Witnesses:
J. W. THOMAS,
C. C. GARDNER.